(12) United States Patent
Robinson

(10) Patent No.: US 12,445,688 B1
(45) Date of Patent: *Oct. 14, 2025

(54) INTERACTIVE MEDIA SYSTEM AND METHOD

(71) Applicant: Todd C Robinson, McLean, VA (US)

(72) Inventor: Todd C Robinson, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 19/190,661

(22) Filed: Apr. 27, 2025

Related U.S. Application Data

(63) Continuation of application No. 18/957,862, filed on Nov. 24, 2024, now Pat. No. 12,363,389.

(51) Int. Cl.
| | |
|---|---|
| H04N 21/478 | (2011.01) |
| G06F 16/435 | (2019.01) |
| G06F 16/44 | (2019.01) |
| G06F 16/9535 | (2019.01) |
| H04N 21/2187 | (2011.01) |
| H04N 21/258 | (2011.01) |
| H04N 21/431 | (2011.01) |
| H04N 21/61 | (2011.01) |

(52) U.S. Cl.
CPC ....... *H04N 21/4781* (2013.01); *G06F 16/435* (2019.01); *G06F 16/44* (2019.01); *G06F 16/9535* (2019.01); *H04N 21/2187* (2013.01); *H04N 21/25891* (2013.01); *H04N 21/4312* (2013.01); *H04N 21/6125* (2013.01)

(58) Field of Classification Search
CPC .......... H04N 21/4781; H04N 21/2187; H04N 21/25891; H04N 21/4312; H04N 21/6125; G06F 16/435; G06F 16/44; G06F 16/9535
See application file for complete search history.

(56) References Cited

U.S. PATENT DOCUMENTS

| | | | |
|---|---|---|---|
| 9,596,502 B1 * | 3/2017 | Abecassis | H04N 21/43074 |
| 2014/0214920 A1 * | 7/2014 | Wong | H04L 65/60 709/203 |
| 2017/0072301 A1 * | 3/2017 | Abecassis | A63F 9/183 |
| 2017/0072302 A1 * | 3/2017 | Abecassis | A63F 9/183 |

FOREIGN PATENT DOCUMENTS

| | | | | |
|---|---|---|---|---|
| EP | 3207968 A1 * | 8/2017 | | H04N 21/43072 |

* cited by examiner

*Primary Examiner* — Nnenna N Ekpo

(57) ABSTRACT

An interactive media system is provided. The interactive media system allows users to access applications via communication devices coupled to a communication network. At least a portion of the network may be wireless. The interactive media system applications include wagering, financial, entertainment service, and other types of transactions. The system may be built-into or overlaid on streaming video on demand platforms.

10 Claims, 5 Drawing Sheets

Process 500

INTERACTIVE MEDIA SYSTEM AND METHOD

CROSS-REFERENCE TO RELATED APPLICATIONS

1. The present invention is a continuation of and claims the benefit of priority to U.S. application Ser. No. 18/957,862, filed Nov. 24, 2024, the entire disclosure of which is incorporated herein by reference.

DETAILED DESCRIPTION

The detailed description set forth below is intended as a description of various configurations of the subject technology and is not intended to represent the only configurations in which the technology can be practiced. The appended drawings are incorporated herein and constitute a part of the detailed description. The detailed description includes specific details for the purpose of providing a more thorough understanding of the technology. However, it will be clear and apparent that the technology is not limited to the specific details set forth herein and may be practiced without these details. In some instances, structures and components are shown in block diagram form in order to avoid obscuring the concepts of the subject technology.

Current interactive media for broadcast, live-stream and recorded media is largely reactive prompting audiences to view media and then respond to questions and trivia. Another form of current interactive media prompts audiences to respond to questions in multiple choice or true/false formats on a specific topic. In education TV or streaming programming, it is common for media producers to show trivia questions before commercial breaks and then simply show the correct answer after advertisements are shown. In both these current interactive media scenarios, there is a disconnection between media and the responses providers by audiences. viewers Competitive gaming has been developed to be enjoyed by players via consoles, mobile and PC systems who play video games. Video games for these systems cover a wide ranges of genre which include action, adventure, board, casual, card/casino, puzzle/trivia, racing, strategy and word puzzle. These formats are created using algorithms and computer code to produce gameplay environments where players compete against a computer or versus other people. Until recently, gameplay environments have been only computer generate settings. However, the interactive media such as augmented reality and virtual reality have expanded gameplay environments to include the physical world and other media.

Interactive puzzle video games have been limited to computer generated environments excluding the use of recorded and live-stream media content. Puzzle video games test players cognitive and recall skills in computer generated settings that contain computer generated audio and visual elements. The puzzle game visual elements are contain characters, scenes and objects are generated using 2D and/or 3D graphics rendering techniques which include sprites, vectors and/or 3D models. Thematic visual elements are presented as moving objects or static images which require player input to answer questions and solve problems. Video game developers have not found a method and system to create puzzle gameplay environments from recorded and live-streamed media content based on the actions, characters and scenes therein.

The consumption and enjoyment of recorded and gameplay media content is overwhelming one directional and lacks an interactive gameplay environment for the viewer to experience. Technological advances make it possible for the viewers of recorded and live-streamed media content to access large amounts of content on devices like personal computers, smartphones, tablets, and TVs.

The subject technology addresses the foregoing limitations by providing a method and system that facilitates the creation and management of interactive media environments based on broadcast, live-stream and recorded media. In this description "player", "user" and "viewer" are used interchangeably to mean one person or group of people using the present invention for competition and enjoyment.

The present invention provides methods and systems for adding cognitive recognition challenges to broadcast, live-streamed and recorded media content for interactive entertainment. The adding of cognitive recognition challenges to broadcast, live-streamed and recorded media content can be applied to various genres of content such as comedy, documentary, news and sports by challenging a player to accurately identify the ephemeral elements occurring within the media environment. Ephemeral elements can be audio or visual elements that occur via the screen and speakers of a user's device. These and other details relating to the use of the broadcast, live-streamed and recorded media content to create a gameplay environment are discussed in more detail herein.

With respect to the embodiments a summary of terminology used herein is provided.

"Content database" refers to the database which stores questions for cognitive recognition challenges, graphic overlays representing ephemeral elements for media content, a tally of the ephemeral elements.

"Content server" refers to the server which compiles the data from the content database and recorded media database.

"DRM Server" refers to the digital rights management server that controls the display of media content based on rights management.

"Ephemeral element" refers to elements recurring audio and visual elements within media content.

"External livestream server" refers to a provider of livestream media content that serves as the basis for the cognitive recognition challenge environment.

"Graphic overlay" refers to the icons which are overlaid on media content to serve as inputs for user responses to cognitive recognition challenges.

"Input device" refers to the device used to register recognition of ephemeral elements within broadcast, live-stream or recorded media.

"Internet Gateway" refers to a node that connects networks with different protocols.

"Media content" refers to the media displayed to form the cognitive recognition environment and contain the graphic overlays for user inputs.

"Media server" refers to the server that compiles the media content and responds to request from the web server.

"Recorded media database" refers to the database which stores media available for on-demand play that serves as the cognitive recognition challenge environment.

"Terrestrial broadcaster" refers to a broadcaster of terrestrial radio or TV that broadcast media content that serves as the basis for the cognitive recognition challenge environment.

"User profile database" stores data on users which includes username, friends list, preferences and play history.

FIG. 1 illustrates an example of the system network environment 100 in some of aspects of the technology can be implemented. Environment 100 includes internet gateway 150, which can include one or more private networks, such as, a local area network (LAN), a wide area network (WAN), or a network of public/private networks, such as the Internet. Internet gateway 150 is communicatively coupled to multiple servers that communicate with endpoints to execute commands, display media content and store/track user inputs within the cognitive recognition challenge environment. The sequence in which users are informed of the challenge and the method users input responses to the challenge are detailed below. Interactive media system 100 represents a network of computing resources configured for implementing media content display and the cognitive recognition challenge content management system of the subject technology.

Viewing the interactive media system from a user initiated prompt directed at recorded media or video on-demand in FIG. 1, devices 172A, 174A and 180 send requests to web server 101 via internet gateway 150 and cloud network 310 to access user profile database 140 and media server 170. Media server 170 sends requests to content server 130 which queries content database 110 and recorded media database 120 to compile assets for the cognitive recognition challenge. The assets of content database 110 for the challenge consist of questions for the user to understand the challenge and the graphic overlays representing ephemeral elements. The content database is house within a NoSQL framework where assets are store in JSON format for query by server. Web server 101 compiles the cognitive recognition challenge data and media from media server 170 and transmits to user devices via internet gateway 150. User devices 172A, 174A and 180 first are shown the cognitive recognition challenge questions and subsequently the media content forming the challenge environment with graphic overlays serving as inputs for user responses. At end of the display of the media content, user responses to the challenge are transmitted to the content database 110 and provided an accuracy score which is device on the user device and recorded in the user profile database 140.

Still referring to FIG. 1 and in one embodiment of the present disclosure, the source of media content creating the cognitive recognition challenge environment is an external live-stream server 210. The external live-stream server 210 transmits media to the content server 130 via the internet gateway 150. Content database 110 provides challenge questions before the live-streamed media and graphic overlays representing the ephemeral elements on user devices 172A, 174A and 180 via media server 170, web server 101 and internet gateway 150. User inputs responding to the interactive challenge are registered via the graphic overlays and tallied in the content database via the web, media and content servers to produce an accuracy score.

In various embodiments of the present invention, the media content type may be music videos, news broadcasts, sports broadcasts or video shorts. For example and in a basketball sports broadcast context, a user could be challenged to recognize the number of times a basketball hits a backboard and is touched by a player wearing an even number. In news broadcast embodiment, a user could be challenged to recognize the number of times the pronoun "it" and the preposition "of" are heard.

Referring now to FIG. 2, an example of an ephemeral element that occurs multiple times within the media content. The cardboard robot head notated by the hashed circle is the ephemeral element in the media content. The ephemeral element would be represented by a graphic overlay on the user device to register recognition of the ephemeral element. FIG. 2 shows only one of what could be multiple ephemeral elements within the cognitive recognition challenge.

FIG. 3A and FIG. 3B illustrate an exemplary player interfaces in which the player device (smart phones, table computer systems or personal computer) displays both the recorded or live-streamed media content (gameplay environment) and haptic inputs to register occurrences of ephemeral elements. The orientation and position of the haptic inputs may be placed as graphic overlays FIG. 3A or positioned on the border of the video frame FIG. 3B. It should be noted that the elements are exemplary and the other embodiments may incorporate more or less than the elements illustrated.

FIG. 4 illustrates the questions corresponding to the media content within a cognitive recognition challenge environment and the ephemeral element icons that will be overlaid on the media content. In order to produce the challenge environment, the questions and icons must be shown before broadcast, display or live-stream of media content. To display the challenge questions and ephemeral element graphic overlays after the broadcast, display or live-stream of the media content would me the present invention a non-interactive viewing experience.

FIG. 5 illustrates steps of an example process 500 for defining a cognitive recognition challenge environment (e.g. recorded or live-stream) and automatically providing the user with the corresponding cognitive recognition challenge questions based on ephemeral elements within media and associated haptic icons/symbols representing ephemeral elements to track performance. Process 500 begins with steps 502, in which a set of attributes are received from the user via a user interface. The user provided attributes can include a genre of recorded or live-stream, artist/performer/producer of media content and year of publication.

In step 502, the system receives parameters and attributes from the user device to select the recorded or live-streamed media content to be displayed as the cognitive recognition challenge environment. In the case of recorded or SVOD media, the user provides inputs to request specific types of media to be displayed for the cognitive recognition challenge environment. In one embodiment of the present invention where music videos serves as the challenge environment, parameters such as artist name, category/genre and/or year of release will be chose by the user. The user may only select particular types of symbols and words attributes to be challenged to en lieu of specifying a type of media.

In step 504, the user provided parameters will automatically query content database 110 and display on the user's viewing device the ephemeral element cognitive recognition challenge questions and ephemeral element symbols and words associated with the media content. This step is needed to inform the user of the performance metrics for the media content.

In step 506, the selected challenge environment and ephemeral element symbols and words are displayed on the user's viewing device. The viewing device can either be a smart phones, table computer systems or personal computer. The ephemeral elements challenge metrics represented by symbols and words are overlaid on the media content in some embodiments. In other embodiments where a second viewing device is displays the challenge environment, the ephemeral element symbols and words are only displayed on the user device to register the recognition by the user.

In step 508, play of the recorded or viewing of the live-stream media is initiated through the internet gateway 150.

In step 510, the user begins to execute haptic inputs to register recognition of the media's ephemeral elements which are logged and tracked by content server 130.

In step 512, the video stops playing ending the display of the challenge environment.

In step 514, the user's registered haptic inputs are computed in the content server 130.

In step 516, the user's performance is assigned a score. The score may be rendered letter, numerical symbol format.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As another specific embodiment for interacting with the various media types described above, there exists asynchronous play between two or more users that are challenged to play the same media and with the same ephemeral elements. In these head-to-head cognitive recognition challenges, users can engage in the challenges at different times. The asynchronous play format is intended to be use with SVOD content.

In another embodiment of the disclosed invention, head-to-head cognitive recognition challenge environments are created from broadcast or live-streamed media content. This format allows two or more users to simultaneously participate in the same cognitive recognition challenge while utilizing separate input devices to register recognition of ephemeral elements within the media. The broadcast or live-streamed media can be viewed on a user's device or on a second screen according to their preference.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

While various embodiments in accordance with the disclosed principles have been described above, it should be understood that they have been presented by way of example only, and are not limiting. Thus, the breadth and scope of the example embodiments described herein should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

As used in the disclosures and the appended claims, the terms "example embodiment," "exemplary embodiment," and "present embodiment" do not necessarily refer to a single embodiment, although they may, and various example embodiments may be readily combined and interchanged, without departing from the scope or spirit of example embodiments. Furthermore, the terminology as used herein is for the purpose of describing example embodiments only and is not intended to be limitations. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

For example, as referred to herein, a machine or engine may be a virtual machine, computer, node, instance, host, or machine in a networked computing environment. Also as referred to herein, a networked computing environment is a collection of machines connected by communication channels that facilitate communications between machines and allow for machines to share resources. Network may also refer to a communication medium between processes on the same machine. Also as referred to herein, a server is a machine deployed to execute a program operating as a socket listener and may include software instances.

Resources may encompass any types of resources for running instances including hardware (such as servers, clients, mainframe computers, networks, network storage, data sources, memory, central processing unit time, scientific instruments, and other computing devices), as well as software, software licenses, available network services, and other non-hardware resources, or a combination thereof.

A networked computing environment may include, but is not limited to, computing grid systems, distributed computing environments, cloud computing environment, etc. Such networked computing environments include hardware and software infrastructures configured to form a virtual organization comprised of multiple resources which may be in geographically disperse locations. Although various computer elements have been illustrated herein as single computer servers or machines, such elements may operate over several different physical machines, or they may be combined as operating code instances running on a single physical machine. The claims in the present application comprehend such variation in physical machine configurations.

Although various computer elements have been illustrated herein as single computer servers or machines, such elements may operate over several different physical machines, or they may be combined as operating code instances running on a single physical machine. The claims in the present application comprehend such variation in physical machine configurations.

Various terms used herein have special meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 C.F.R. 1.7 or otherwise to provide organizational cues. These headings shall not limit or characterize the invention(s) set out in any claims that may issue from this disclosure. Specifically, a description of a technology in the "Background is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

Figure 1:
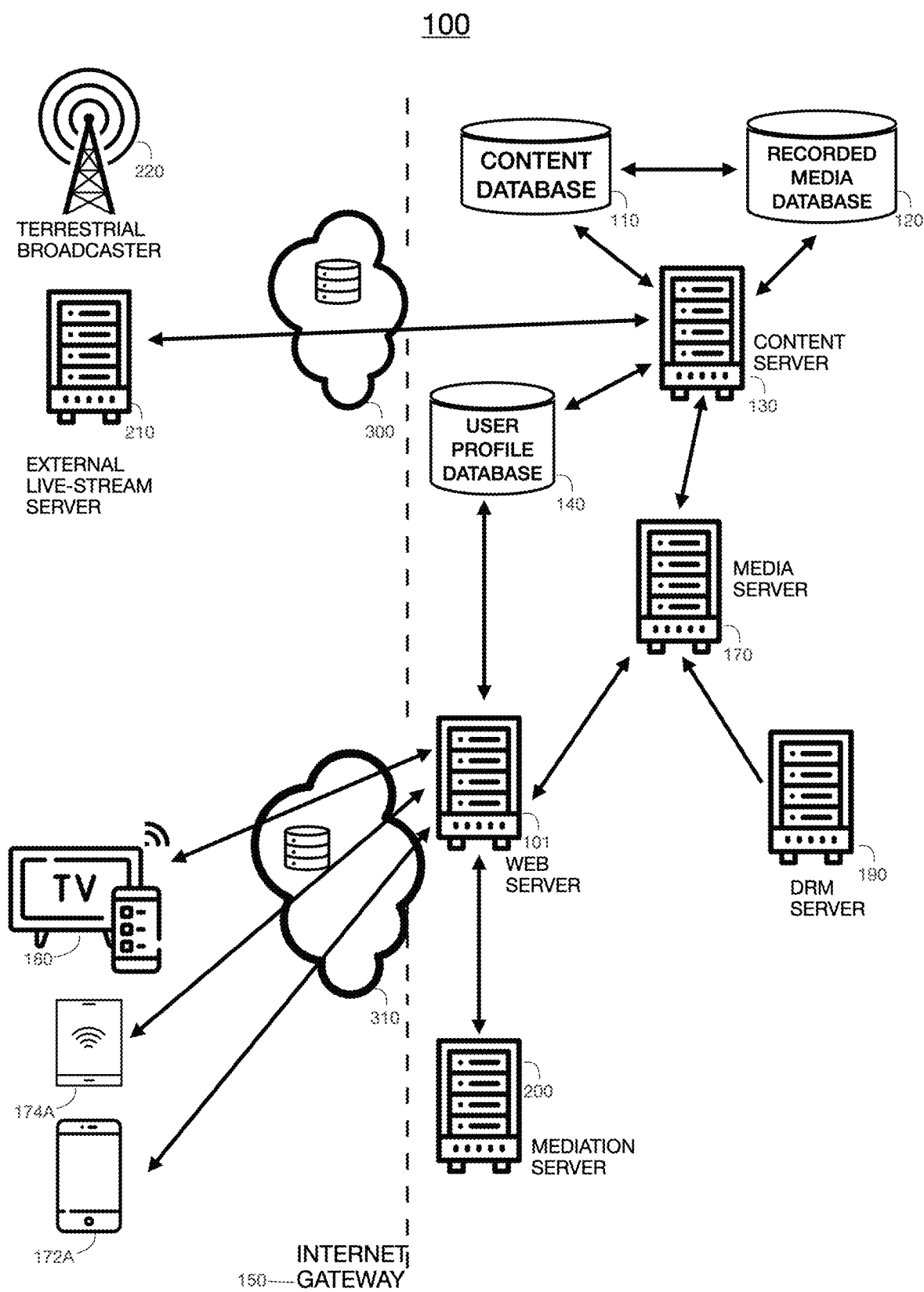
FIG 1. illustrates an example of a network environment in which some aspects of the technology can be implemented.
Figure 2:
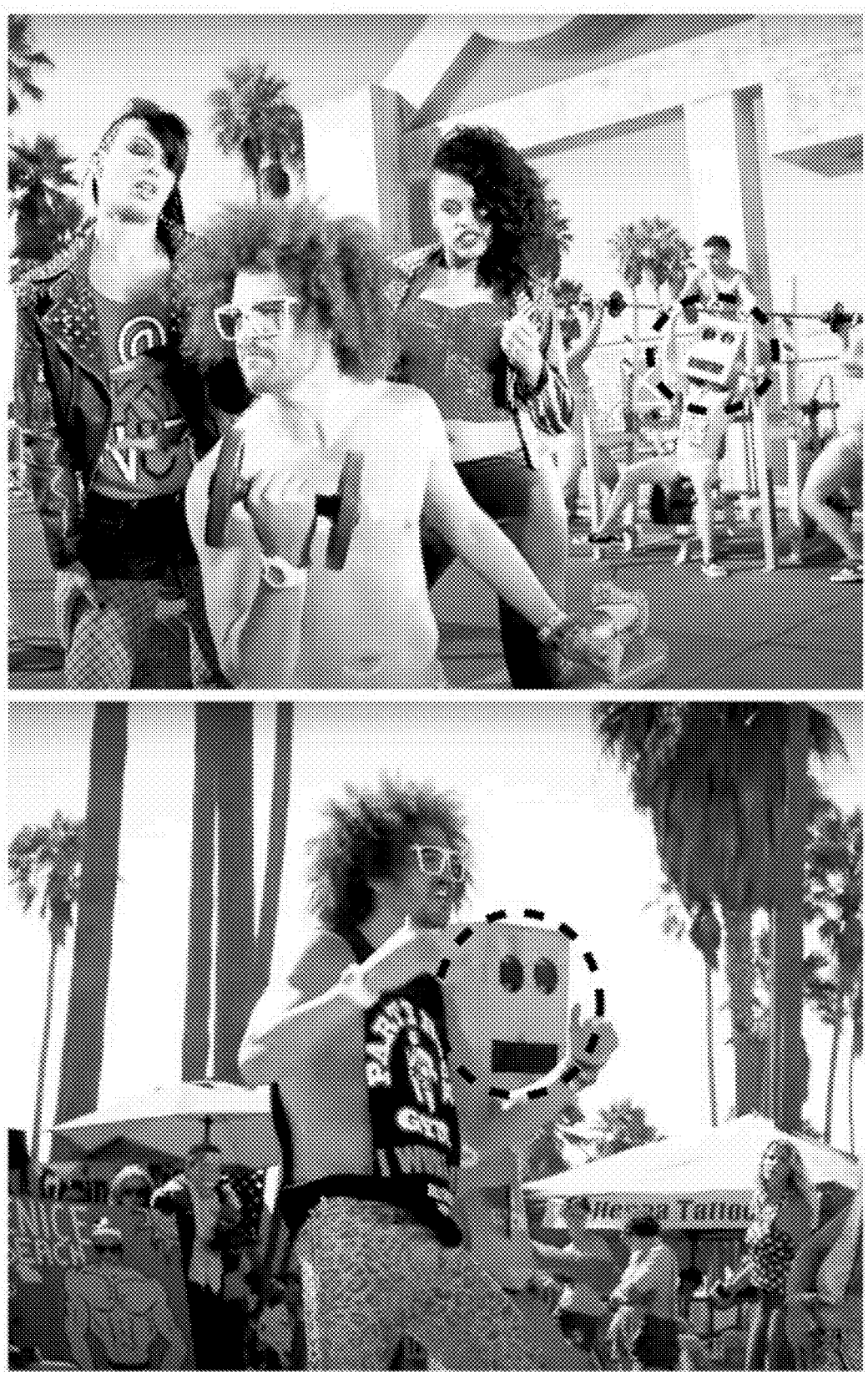
FIG 2. illustrates examples of ephemeral elements in media content in connection with gameplay events.
Figure 3A:
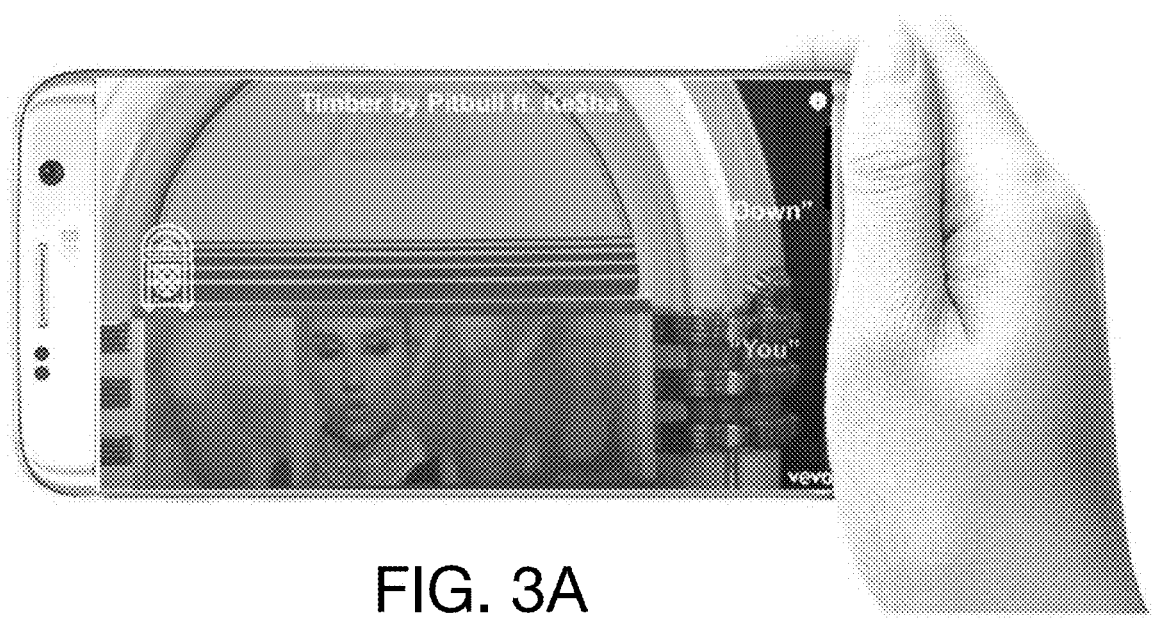
FIG. 3A illustrates media content and the position of cognitive recognition ephemeral element input overlays in accordance with aspects of the invention.
Figure 3B:
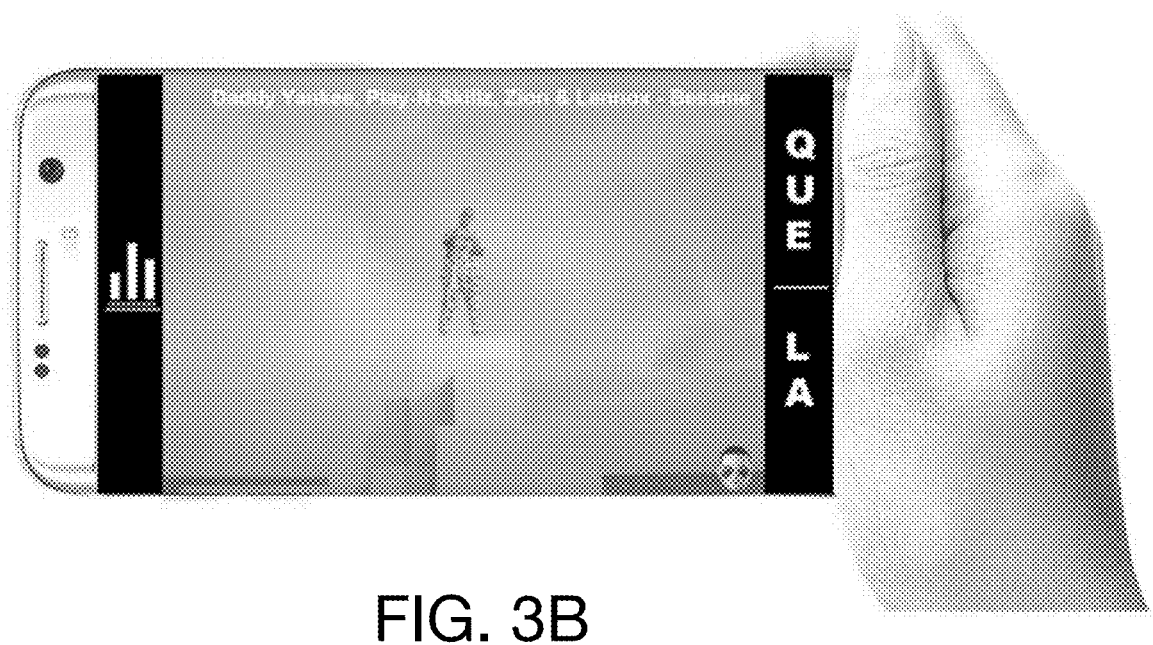
FIG. 3B illustrates media content and the position of cognitive recognition ephemeral element input overlavs in accordance with aspects of the invention.
Figure 4:
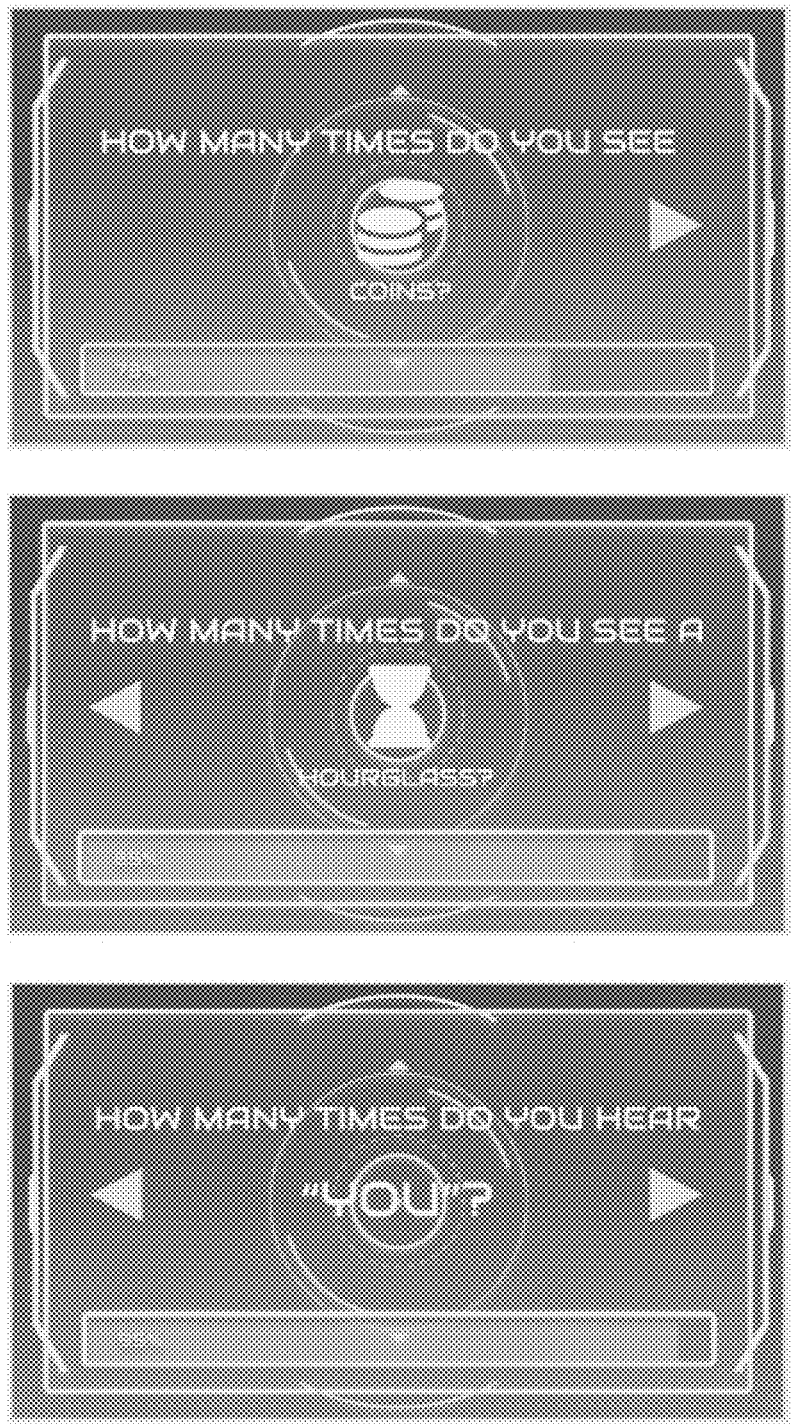
FIG. 4 illustrates questions pertaining to the frequency of ephemeral elements shown before licensed media playback or stream from a cognitive recognition challenges in accordance with aspects of the invention.
Figure 5:
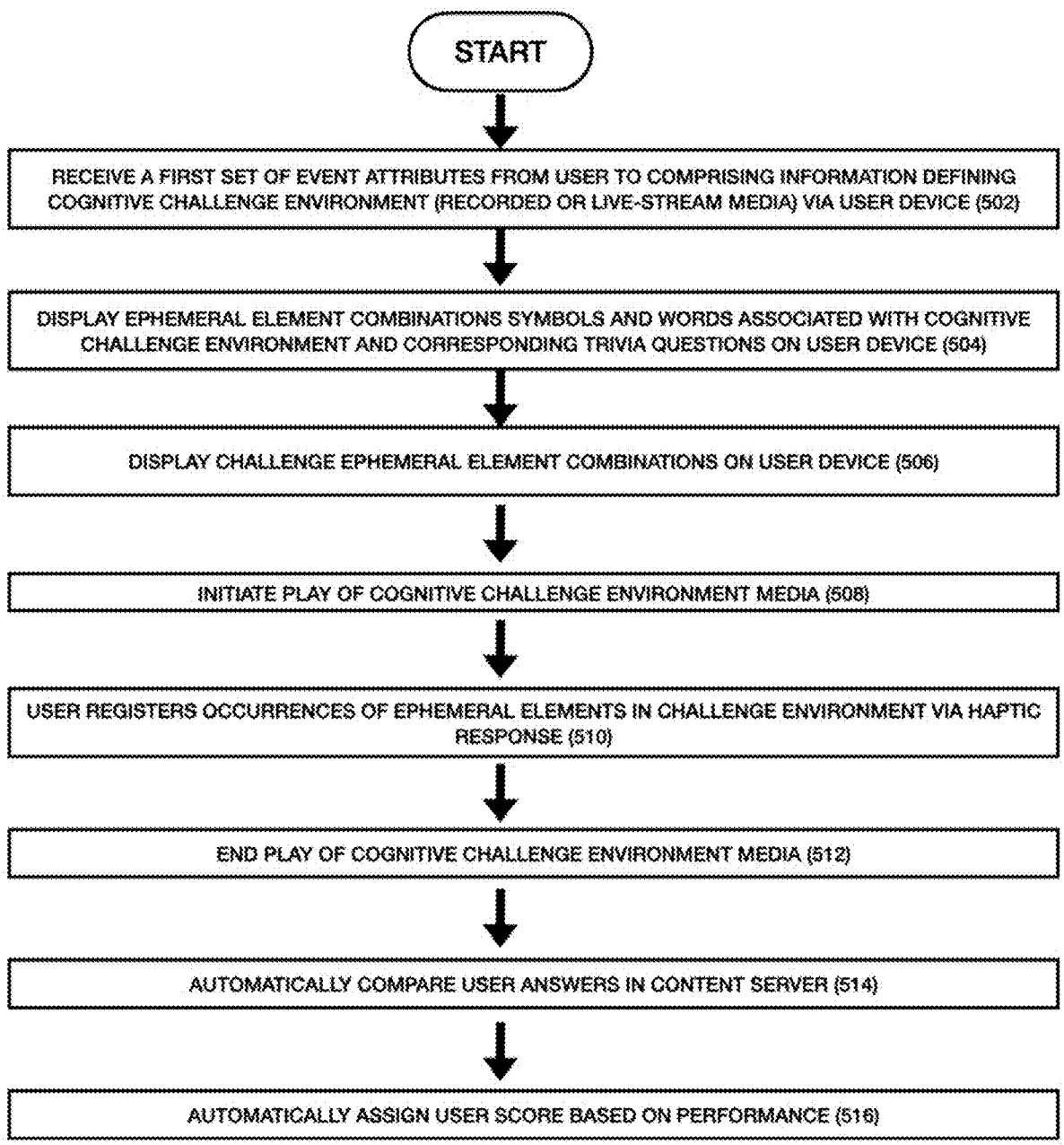
FIG. 5 is a flowchart of process for an interactive media system in accordance with aspects of the invention.

The invention claimed is:

1. A method for generating an interactive cognitive recognition challenge using media content, the method comprising:
    (a) generating a web server configured to communicate with one or more user devices via an internet gateway;
    (b) generating a user profile database configured to store gameplay attributes including user preferences, play history, and performance scores;
    (c) generating a content database configured to store media metadata, the metadata including:
        (i) a tally of ephemeral audio and visual elements associated with media content;
        (ii) challenge questions based on occurrence or frequency of the ephemeral elements; and
        (iii) graphic overlays corresponding to the ephemeral elements;
    (d) receiving user selection input to initiate a challenge based on recorded or live media;
    (e) retrieving the selected media content from a recorded licensed media database or receiving it from an external live-stream source;
    (f) transmitting the challenge questions to a user device before initiation of media playback;
    (g) overlaying the graphic overlays representing the ephemeral elements directly on the media content during playback;
    (h) receiving user responses through haptic inputs corresponding to the ephemeral elements presented during playback;
    (i) evaluating the accuracy of the user responses based on timing and position of the haptic input relative to the ephemeral element occurrences; and
    (j) calculating and storing a performance score in the user profile database.

2. The method of claim 1, further comprising verifying that a client device is authorized to access the media content using a digital rights management system.

3. The method of claim 1, wherein the user responses are recorded asynchronously and compared against a reference sequence for scoring.

4. The method of claim 1, wherein the challenge questions are displayed on a first device and the media content is played on a second device.

5. The method of claim 1, further comprising determining whether the user qualifies for a tournament or level advancement based on the calculated performance score.

6. The method of claim 1, wherein the user is presented with a mashup of multiple media clips containing selected ephemeral elements for a compound recognition challenge.

7. The method of claim 1, further comprising generating a peer-to-peer challenge session between two or more users using the same media content.

8. The method of claim 1, wherein the performance score is displayed in real time and compared to scores of other users participating in the same challenge.

9. The method of claim 1, wherein ephemeral elements are detected and tagged in media content using an artificial intelligence-based tagging engine prior to storing the metadata.

10. The method of claim 1, further comprising transmitting an invitation from one user to another to join a shared challenge session during playback of the media content.

\* \* \* \* \*